Feb. 28, 1961    E. UMBRICHT ET AL    2,972,995
WASHING APPARATUS

Filed Oct. 20, 1954    6 Sheets-Sheet 1

INVENTORS
EMIL UMBRICHT
DEWEY EVANS
BY
Curtis, Morris & Safford
ATTORNEYS

Feb. 28, 1961 E. UMBRICHT ET AL 2,972,995
WASHING APPARATUS
Filed Oct. 20, 1954 6 Sheets-Sheet 2

INVENTORS
EMIL UMBRICHT
DEWEY EVANS
BY
Curtis, Morris & Safford
ATTORNEYS

Feb. 28, 1961   E. UMBRICHT ET AL   2,972,995
WASHING APPARATUS

Filed Oct. 20, 1954   6 Sheets-Sheet 3

INVENTOR
EMIL UMBRICHT
DEWEY EVANS
BY
Curtis, Morris & Safford
ATTORNEYS

FIG. 12.

INVENTORS
EMIL UMBRICHT
DEWEY EVANS
BY
Curtis, Morris & Safford.
ATTORNEYS

Feb. 28, 1961   E. UMBRICHT ET AL   2,972,995
WASHING APPARATUS

Filed Oct. 20, 1954   6 Sheets-Sheet 5

INVENTORS
EMIL UMBRICHT
DEWEY EVANS
BY
Curtis, Morris & Safford
ATTORNEYS

INVENTORS
EMIL UMBRICHT
DEWEY EVANS
BY
ATTORNEYS

United States Patent Office 2,972,995
Patented Feb. 28, 1961

2,972,995
WASHING APPARATUS
Emil Umbricht, Jackson, and Dewey Evans, Belleville, Mich., assignors to AJEM Laboratories, Detroit, Mich.
Filed Oct. 20, 1954, Ser. No. 463,471
16 Claims. (Cl. 134—72)

This invention relates to a machine for washing engine blocks or other mechanical parts. The necessity for efficient, automatic apparatus for washing parts in mass production industries is assuming continually increasing importance. There are a number of reasons for this in addition to the general tendency toward a higher degree of mechanisation. For one thing, many types of modern machinery, such as automobiles, include parts held to closer tolerances so that the presence of even minute quantities of soil or dirt cause excessive wear. In addition, the development of improved cleaning compounds makes possible the cleaning of parts with liquid at room temperature provided the cleaning apparatus is arranged to give maimum efficiency in creating a spray of cleaning liquid over all portions of the part being cleaned with sufficient force to remove the soil or other contaminating material.

The present invention is described as embodied in a power washer especially adapted for washing automobile engine blocks. The apparatus carries the engine block which is to be washed through multiple stage washing and rinsing sections. While the block is passing through these sections, the washing liquid is caused to impinge upon the block at high velocity by a series of jets which are successively directed at different portions of the outer surface of the block so as to remove all of the contaminating soil or other material. During this washing action, the block rotates continuously so that all portions of the block are exposed to the spray of liquid. In addition, the washing liquid is forced into the internal portion of the engine block under high pressure while the block is being rolled or tumbled, so that heavy residues within the block are not only washed loose but caused to fall out of the block. This is important particularly in the initial washing steps of an engine block because large pieces of foreign matter, such as wires from foundry casting and coarse sand, may have accumulated in pockets in the casting. Again, in the rinse section, a similar tumbling action provides maximum drainage of any liquid that may be held internally within the blocks.

The various features, aspects, and objects of this invention will be in part pointed out in and in part apparent from the following description of an engine block washing machine embodying the present invention, considered in connection with the accompanying drawings, in which.

Figure 1:
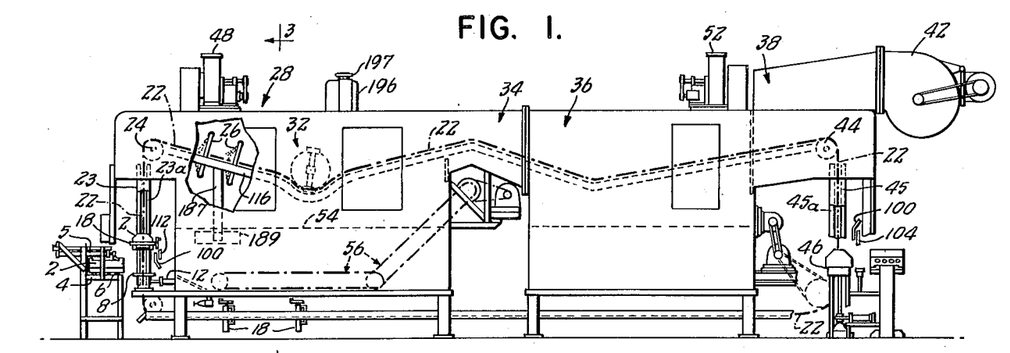
Figure 1 is a diagrammatic side view showing the arrangement of the washing, rinsing, and drying sections.

As shown in Figure 1, the engine block 2 which is to be washed enters the washing machine from the left. Ordinarily this block will be received from a conveyor on which the blocks are positioned in end to end relationship. The blocks are received on a platform, diagrammatically illustrated at 4, and are pushed by a hydraulic cylinder 5 over a series of rollers 6 to be received upon a turntable 8 positioned at the end of the washing machine. The turntable 8 is rotatably mounted and is arranged to be rotated through 90° by a hydraulic cylinder 12 (see also Figure 2) so that the block 2 is positioned transversely of the direction of its path through the washing machine. While the block is in this position it is clamped automatically into a block holding fixture 18 which is supported by a continuous conveyor chain 22. This fixture lifts the block vertically, being guided by guides 23, to the upper portion of the washer and carries it along the path indicated by the conveyor chain 22 in Figure 1.

Figure 3:
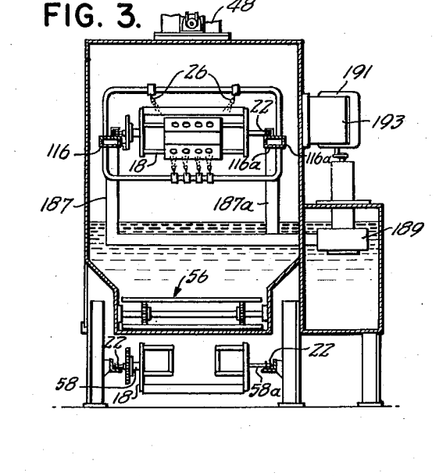
Figure 3 is a sectional view taken along line 3—3 of Figure 1.
Figure 11:
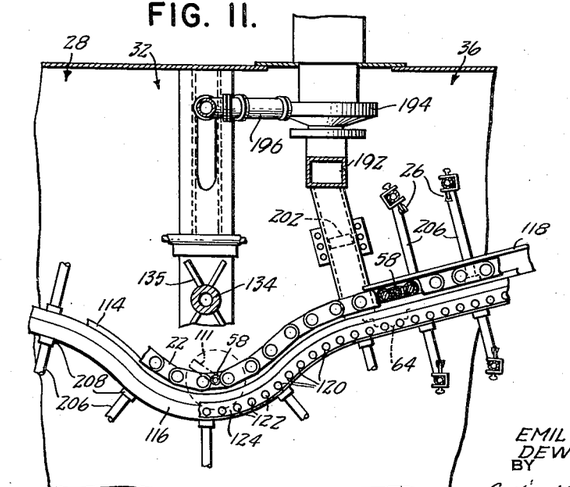
Figure 11 is a partial longitudinal sectional view through the machine showing the conveyor arrangement in the internal block-flushing section.

As the block moves up vertically from the turntable 8 it begins to be continuously rotated after it has been locked into the fixture 18. It rotates all the white it passes through the machine until after passing over the sprockets 44 at the far end. After the block has passed a first pair of idler sprockets 24 it passes beneath a series of jets 26 which spray water or other cleaning liquid under substantial pressure upon the outer surface of the block. As the block is passing through the washing section of the machine, diagrammatically indicated at 28, the internal openings in the block are flushed out while the block continues to rotate, thus thoroughly cleaning the interior portions of the block. This internal flushing action takes place in the area indicated at 32 in Figure 1. The outer surfaces of the block are then further washed by additional jets 26 (as shown in Figures 1, 3 and 11), after which the block passes through a tunnel area, generally indicated at 34, and enters the rinse area 36. While passing through the rinse area the block is continuously tumbled or rolled about its longitudinal axis while the block is rinsed by means of additional jets 26 (not shown in Figure 1) distributed throughout the rinse section. The block then enters a drying section 38 in which the block is subjected to a blast of warm air supplied by a blower 42 during which time the block continues to be tumbled so that all surfaces of the block are thoroughly dried.

The conveyor chain then passes over two idler sprockets 44 and thence carries the block downwardly being guided by guides 45 and delivers it to a table 46, after which the block is rotated 90°, by any suitable mechanism, so that the blocks leave the washing machine again in end to end relationship so that they can be conveniently carried along a continuation of the conveyor line by which the blocks were delivered ot the washing machine.

The holding fixture 18 then returns with the conveyor chain back along the lower portion of the washing machine (please see Figure 3) to the entrance where it receives another block and carries it again along the same path. It will be understood, of course, that the conveyor chain 22 carries a number of block holding fixtures which, for example, may be spaced at intervals of three to six feet along the conveyor chain, but only one of the block-holding fixtures will be described in detail. Two blowers, 48 and 52, communicate respectively with the washing stage 28 and the rinsing stage 36 for removal of fumes.

In order to remove the soil and other material which accumulates in the wash chamber 28, which is filled with cleaning liquid to the depth indicated by the line 54, a sludge conveyor, diagrammatically indicated at 56, is arranged to remove the sludge from the bottom of the tank in the wash section and carry it into the space beneath the tunnel 34 from which the sludge is disposed of in any desired manner. This sludge conveyor is conventional in construction and does not form any part of the present invention and accordingly is not shown or described in detail.

Figures 4, 5, 6:
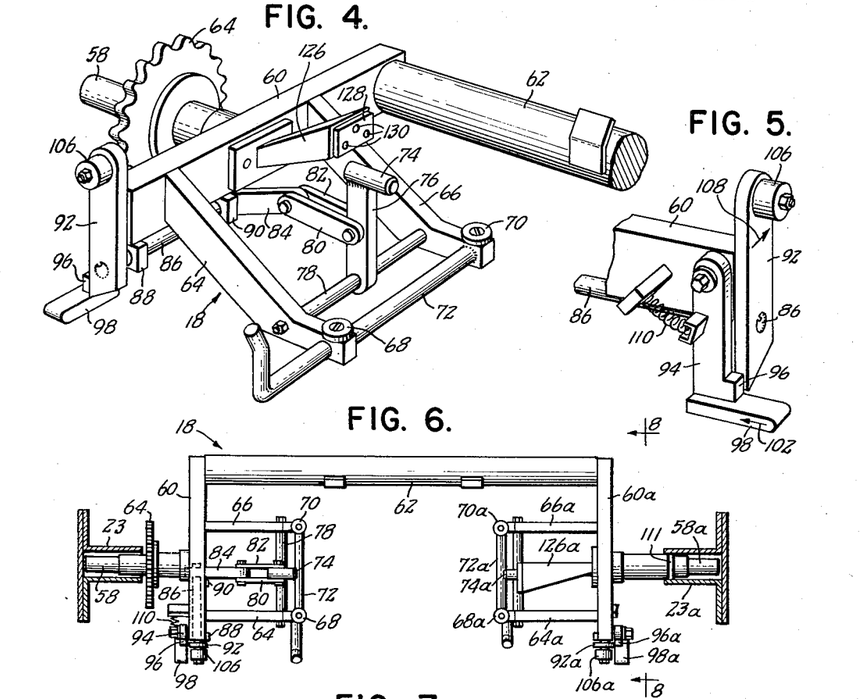
Figure 4 is a perspective view of one end of the engine block carrier which supports the block and carries it through the washing machine.
Figure 5 is a partial perspective view showing the locking arrangement of the block-holding fixture.
Figure 6 is a top view of the engine block carrier.

Figure 4 is a perspective view showing one end portion of the block holding fixture 18. The two end portions of the block holding fixture are symmetrical when the opposite ends of the blocks are similar; where the opposite ends of the blocks differ, the opposite ends of the fixture may differ in details, but are generally similar, and accordingly corresponding parts on the opposite end are indicated by corresponding numerals followed by the suffix *a*. The block holding fixture is supported by two hollow trunnions 58 and 58*a* (see also Figure 6) which is connected to end frame members 60 and 60*a*, respectively. The two frame members 60 and 60*a* are connected together by a cylindrical cross member 62.

As shown in Figures 11, 19, 20 and 21 the conveyor includes two chains 22 and 22*a* of the link and cross-pin type. The hollow trunnions 58 and 58*a* extend out through the links of the chain passing centrally through pairs of links mid-way between the respective cross pins. The diameter of the trunnions at the points where they pass through the chains is less than the outside diameter of the spacing sleeves 59 surrounding the cross pins 61 of the chain. Stiffening braces 63 are welded to sleeve bearings 65 for holding the trunnions 58 and 58*a*.

Figure 7:
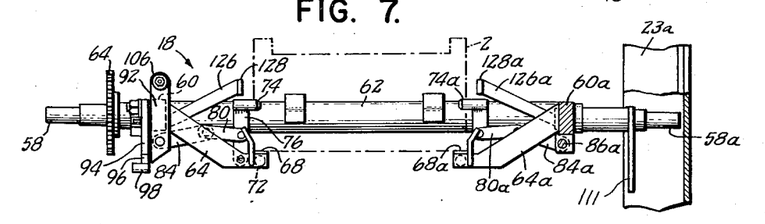
Figure 7 is a side view of the engine block carrier showing the track and tumbling means.

The trunnion 58 carries a sprocket 64 which is secured to the outer surface of the trunnion 58 and is provided for the purpose of causing the continuous rotary movement or tumbling action of the frame 18. This sprocket 64 is not duplicated on the opposite side of the frame 18 inasmuch as one sprocket is sufficient to provide the desired tumbling action. The other trunnion 58*a* carries a lever 111 rigidly secured thereto and running between guides 23*a* extending up past the turntable 8, as shown in Figures 1, 6 and 7, to prevent rotation of the fixture 18 as the block is locked into it. As shown in Figures 1, 10, 11, and 19 the lever 111 is freed from the guides 23*a* and then permits rotation of the fixture after the block has been loaded into the fixture.

The end frame member carries two block supporting members 64 and 66 extending downwardly and inwardly from the end frame member 60, each of which has a short extension carrying block supporting pads 68 and 70 respectively on which the engine block rests. The block supporting members 64 and 66 are welded or otherwise rigidly secured to the end frame member 60 with sufficient strength to support the weight of the engine block. The two end portions of the block supporting members 64 and 66 are connected together by a bar 72 which provides additional rigidity for the framework.

In order to lock the block in position in the block holding fixture 18 so that it will not be dislodged when the frame 18 is rotated by the sprocket 64, a pivotally-mounted locking finger 74, formed for example from a short length of steel rod, is arranged to project into an opening in the end of the engine block so as to hold the engine block firmly against the pads 68 and 70 irrespective of the rotation of the frame 18. The locking finger 74 is welded to the end of an arm 76 that is pivotally mounted on a cross bar 78 extending between the two block supporting members 64 and 66. Movement of the locking finger 74 is produced by means of toggle arrangement comprising a pair of parallel links 80 and 82 pivotally connected at one end to opposite sides of the arm 76 and at the opposite end to an operating arm 84 which is rigidly connected to a shaft 86 rotatably supported in bearing members 88 and 90 which are secured to the end frame member 60.

The outer end of this shaft 86 is keyed or otherwise rigidly secured to a latch member 92 which, when the engine block is positioned on the frame 18, is locked in position by an L-shaped locking member 94 (see also Figure 5). The locking member 94 carries a block 96 which in the position shown in Figures 4 and 5 holds the latch member 92 in locked position with the finger 74 engaging the opening in the engine block.

Figure 8:
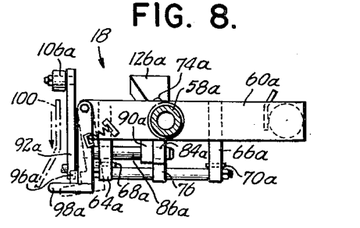
Figure 8 is an end view of the engine block carrier.
Figure 9:
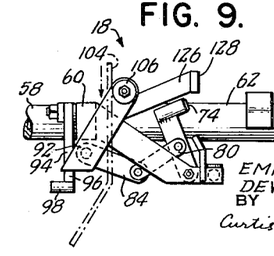
Figure 9 is a partial side view of the engine block carrier.

In order to release the block from the fixture 18, a cam extension 98 on the locking member 94 is moved by a cam, indicated diagrammatically at 100 in Figure 8, in the direction of the arrow 102 in Figure 5. A second cam member, indicated diagrammatically at 104 in Figure 9, cooperates with a roller 106 on the latch member 92 to move one end of the latch member in the direction indicated by the arrow 108 in Figure 5. This movement of the latch member 92 rotates the shaft 86 and arm 84 to operate the toggle and move the locking finger 74 to the position indicated in Figure 9. A spring 110 shown in Figure 5 normally holds the locking member 94 in locked position and returns it to locked position when the force of the operating cam is removed.

Figure 2:
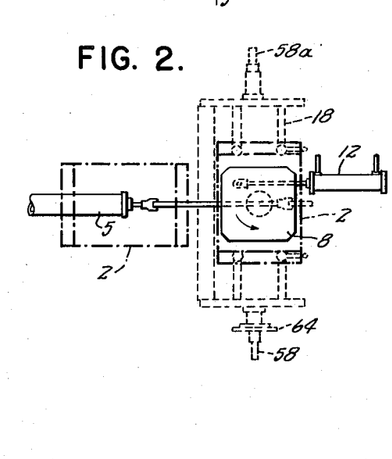
Figure 2 is a partial elevational view of the block-rotating platform of the machine shown in Figure 1.
Figure 18:
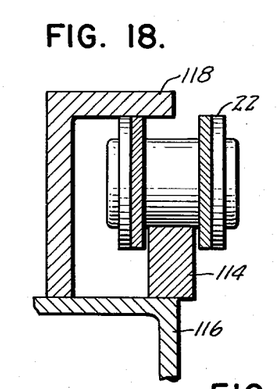
Figure 18 is a sectional view showing the conveyor chain and its associated track.
Figures 19, 20, 21:
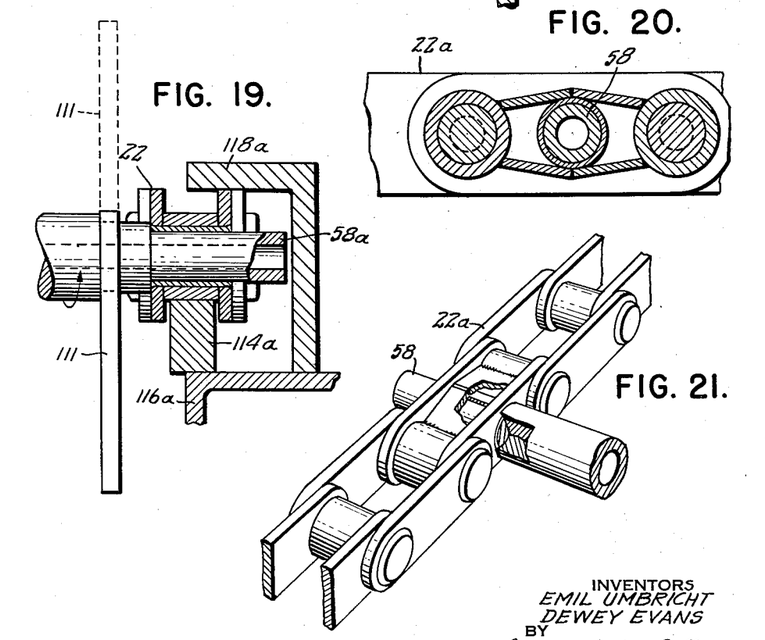
Figure 19 is a sectional view showing the hollow trunnion of the block-holding fixture as supported by the conveyor chain.
Figure 20 is a longitudinal sectional view illustrating a part of the conveyor chain carrying a trunnion of the block-holding fixture.
Figure 21 is a perspective view of part of the conveyor chain.

In operation, when the frame 18 moves upwardly around the platform 8, as shown in Figures 1 and 2, the cam 100 holds the locking member 94 in unlocked position as the block 2 is lifted upwardly by the frame 18, and the rigid lever 111 runs within the guides 23*a* to prevent rotation to the frame 18, while a locking cam 112 strikes the roller 106 and moves the locking finger 74 into engagement with the engine block. The locking member 94 is then released and the spring 110 returns it to locked position thus firmly clamping the engine block 2 in the frame 18. The hollow trunnion 58 is connected to the conveyor chain 22 as best shown in Figures 18, 19, and 20. The end of the trunnion 58 extends through a special link member in the chain 22. This chain 22 straddles the upper edge of a track 114 which extends throughout the length of the path of the chain 22 through the washing, rinsing, and drying sections. The track 114 is supported by a liquid supply manifold 116 (see also Figures 10 and 11) which supplies cleaning liquid to the jets 26. Throughout the path of the conveyor chain, except where internal flushing of the engine block is being provided, the conveyer chain is surmounted by a guide member 118 of L-shaped cross section which is secured to the liquid supply manifold 116 or other suitable supporting member. Corresponding track arrangements are provided on each side of the washer to support the trunnions 58 and 58a. In order to provide the rotary motion of the frame 18 as it progresses through the stages of the washer, a series of rollers 120 (see Figures 10 and 11) are supported by pins 122 mounted on an angle iron 124 extending inwardly from the manifold 116 along one side of the washer. These rollers 120 are spaced apart by distances corresponding to the spacing of the teeth in the sprocket 64 so that each succeeding roller 120 is engaged by one of the successive teeth of the sprocket 64, thus causing the rotation of the frame 18 as it moves along the track 114. The manifold 116a along the opposite side of the washer is similar in all respects to the manifold 116 but is not provided with rollers 120.

In order to provide the internal flushing of the block, a hollow jet supply member 126 (Figure 4) is supported by the cross member 60 and is connected to the opening in the hollow trunnion 58. The inner end of the jet supply member 126 is covered by a face plate 128 having a number of openings 130 which are positioned to correspond with openings in the end of the block 2 which lead to the internal cavities of the block which are to be flushed with cleaning liquid. The liquid enters the trunnion 58 under high pressure and is sprayed from the openings 130 in the form of high-pressure jets into the openings in the block. It will be understood, of course, that a corresponding jet supply arrangement is provided on the opposite end of the frame 118 so that cleaning liquid simultaneously enters each end of the block being cleaned.

Figure 10:
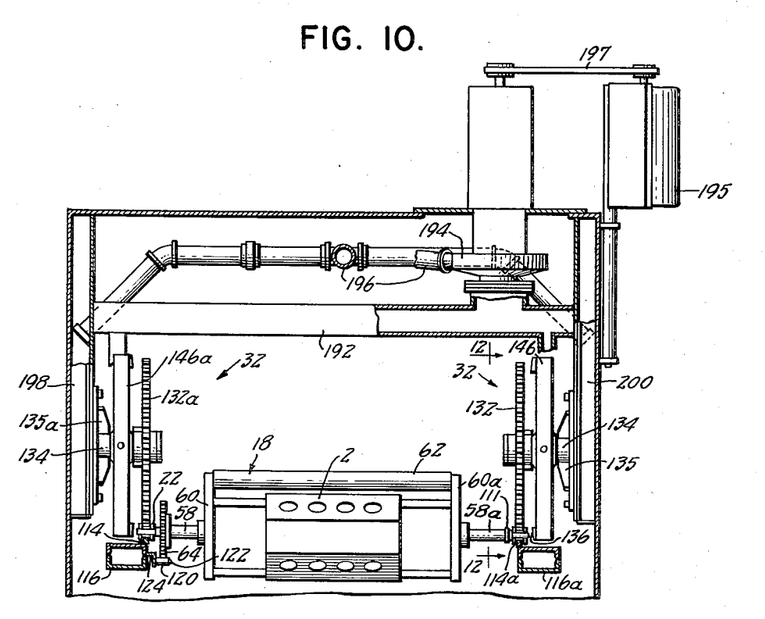
Figure 10 is an interior view showing the arrangement for internal flushing of the block.

The arrangement by which this cleaning liquid is forced into the hollow trunnions while the block and frame 18 continue to rotate is best illustrated in Figures 12 through 15. Because similar water supply arrangements are provided on each side of the washer, only the supply arrangement indicated on the right-hand side of Figure 10 will be described in detail, it being understood that a corresponding arrangement is provided on the opposite side of the washer where the corresponding parts are indicated with similar reference characters followed by the suffix a. A large sprocket wheel 132 is rotatably supported on a stationary shaft 134 which is supporter by a base 135 secured to a high pressure manifold 200 at one side of the washer as best shown in Figure 10. The position of this shaft 134 with respect to the conveyor chain 22 is best shown in Figure 11 where it will be noted that the chain 22 follows an arcuate path, the center of which corresponds with the position of the shaft 134.

When the trunnion 58a reaches this portion of the path, it engages one of the notches in the periphery of the sprocket 132 (Figure 14) and thus rides around the periphery of the sprocket being held in position between the teeth of the sprocket and the opposing surface of the track 114. At the time the trunnion 58a engages the sprocket 132 a nozzle 136 is moved forwardly and engages the end of the trunnion 58a at which time cleaning liquid is caused to flow through a central opening 140 in the shaft 134 downwardly through a length of flexible hose 142 and through the nozzle 136 into the hollow trunnion 58a.

Figure 14:
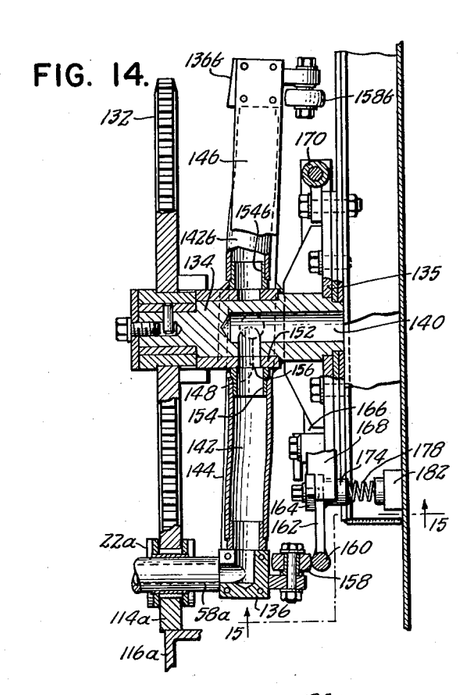
Figure 14 is a sectional view of the internal flushing apparatus shown in Figure 13.

The nozzle 136 and hose 142 are pivotally supported for rotation about the shaft 134 so that as the trunnion 58a follows around the periphery of the sprocket 132, the nozzle 136 moves through a corresponding arc so that cleaning liquid is continuously fed into the interior of the block 2, from both ends. Among the advantages of simultaneously injecting liquid from both ends is that it thoroughly cleans the transverse passages as well as the longitudinal passages in the block. We have found that where the injection is from only one side the liquid tends to shoot through the longitudinal passages and to miss the transverse or side passages.

Figure 12:
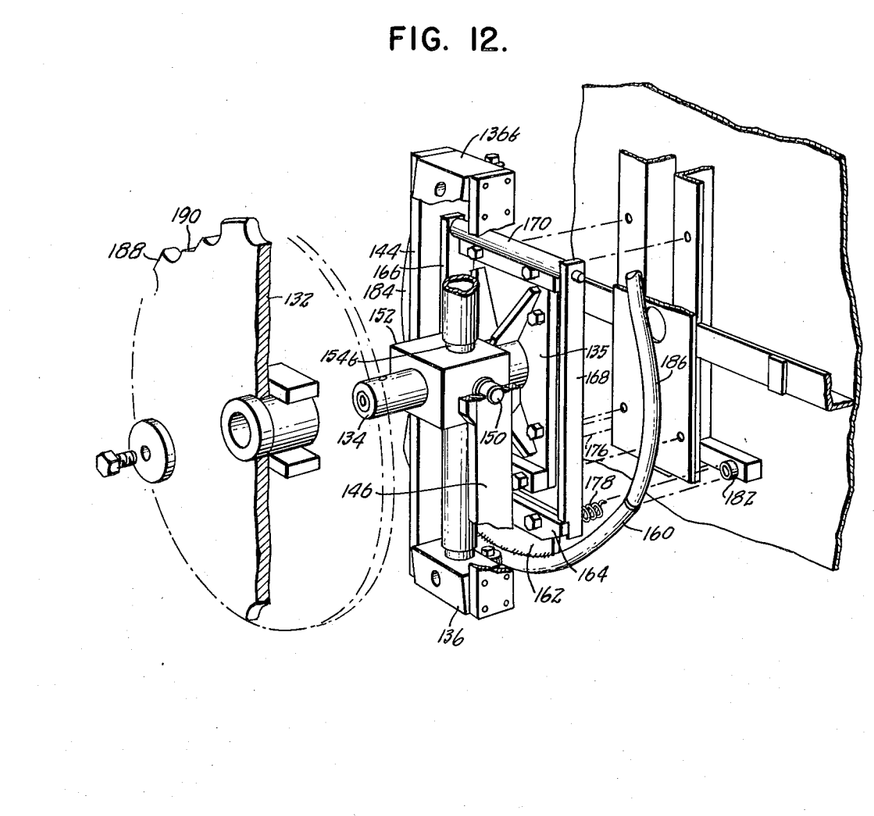
Figure 12 is a perspective partially exploded view of the apparatus for flushing out the interior of the block while the block is rotating.

The nozzle 136 is supported by a pair of side arm members 144 and 146, best shown in Figure 12, which are mounted on pivots 148 and 150 (Figure 13) projecting from opposite sides of a valve block 152 which carries the pivots 148 and 150 and which is provided with a central bore through which the shaft 134 extends. The side members 144 and 146 extend also on the opposite side of the valve block 152 where they support a second similar nozzle 136. The nozzle 136b is connected by the hose 142 to a suitable fitting 154 on the valve block 152 while the opposite nozzle assembly 136b is connected by a hose 142b to a valve fitting 154b on the opposite side of the valve block 152.

Figure 16:
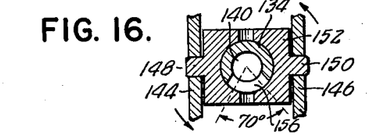
Figure 16 is a partial sectional view showing the valve means by which the flow of cleaning liquid to the internal portions of the block is controlled.

Within the valve block 152 the stationary shaft 134 has a bore 156 extending downwardly from the central opening 140. This bore 156 desirably extends over an arc of approximately 70 or 80 degrees. As will be seen best from Figure 16, cleaning liquid within the opening 140 in the shaft 134 is permitted to flow outwardly through only the lower opening in the valve block and then only during the time that the opening in the valve block is traversing the 70 or 80 degree arc corresponding to the radial opening into the center of the shaft 134.

Figure 15:
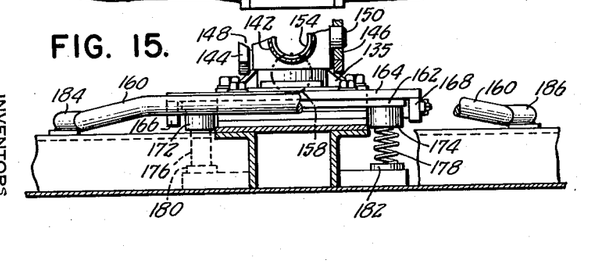
Figure 15 is a partial view taken along line 15—15 of Figure 14.

In order to control the engagement of the assembly carrying the nozzle 136 with the end of the trunnion 58a, a cam roller 158 is supported on the rear of the nozzle 136 and is arranged to engage a cam member 160. The cam 160 is formed of an arcuately-shaped rod extending part way around the base 135. The cam roller 158 moves along the adjacent surface of the cam member 160 into that portion of the arc where the nozzle 138 is to be moved forwardly into engagement with the trunnion 58a, the cam member 160 is curved outwardly in the direction of the trunnion 58a, and thus provides the desired camming action. This portion of the cam member 160 is best shown in Figure 15.

In order to provide a substantially water-tight connection without the maintenance of precision tolerances, the cam member 160 is spring supported so that the nozzle 136 is urged with resilient pressure against the end of the trunnion 58a irrespective of minor dimensional variations. To accomplish this, the lower portion of the cam member 160 is welded to a supporting plate 162 along the arcuate edge of this plate. The plate 162 is in turn supported by a pivotally mounted rack comprising a lower cross member 164 and opposing side arm members 166 and 168 extending upwardly from the cross member 164. The upper ends of the members 166 and 168 are pivotally supported on a rod 170 which is welded or otherwise secured to the base 135. The cross member 164 carries a pair of spring receiving cups 172 and 174 which receive the ends of two compression springs 176 and 178, the opposite ends of which are positioned in similar retaining cups 180 and 182 supported by the outer frame of the washing machine. Thus, the nozzle 136 is forced by the springs 176 and 178 into firm contact with the end of trunnion 58a, even though the successive trunnions may have somewhat different dimensions.

It will be apparent that the nozzle assembly 136b, carried on the opposite ends of the side arms, operates in a similar manner, and that these two nozzles 136 and 136b operate in succession, one after the other as each of the succeeding engine holding fixtures engages the sprocket 132.

Figure 13:
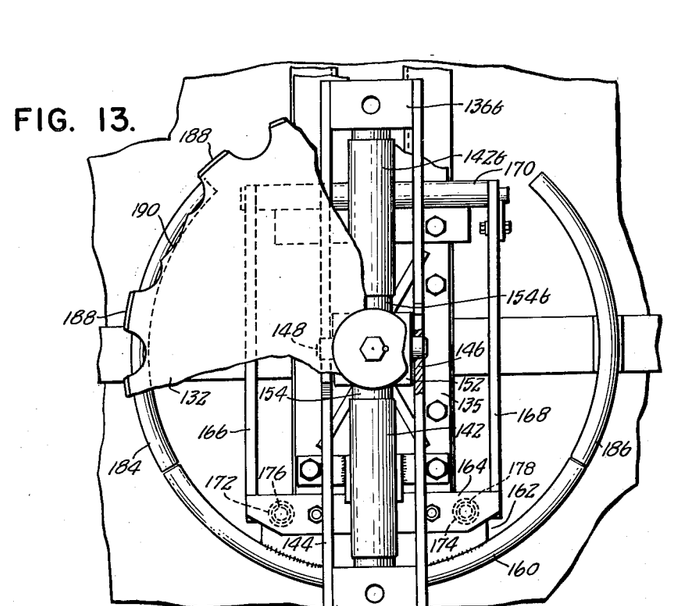
Figure 13 is an elevational view of the apparatus shown in Figure 12 with parts cut away to better illustrate the construction.

The cam member 160 is provided with cam extensions 184 and 186 which are welded or otherwise rigidly secured to the frame of the washing machine, thus providing guide surfaces for the approach of the cam rollers 158 and 158b to and from the cam member 160. The sprocket 132 is rotated continuously by the moving conveyor chain 22 and is provided with teeth 188 which engage the chain. The surface of this cam, however, is cut away at spaced intervals as at 190 to receive the trunnions, as best shown in Figures 12 and 13. The block holding frames 18 are spaced along the conveyor chain by a distance equal to one-half the circumference of the sprocket 132 so that the nozzles 136 and 136b are in position to engage each of the successive trunnions. This wash assembly is identical on each side of the washer so that cleaning fluid is simultaneously injected into each end of the engine block. It will be apparent that minor modifications in the structure will be made depending upon the construction of the parts to be washed, and that the jet openings, such as the openings 130 in the face plate 128 of Figure 4, will be positioned to correspond to the openings in the part to be washed.

The manifolds 116 and 116a are supplied through pipes 187 and 187a from a centrifugal pump 189 driven by V-belts from a large motor 191 supported on a pivotally mounted bracket 193 to enable belt tension adjustment. In order to provide efficient flushing of the interior of the engine blocks or other parts which are to be washed, the liquid supplied to the flushing jets through the trunnions 58 and 58a is under increased pressure over that provided for the spray jets 26. To accomplish this, a supply manifold 192 is connected at opposite ends to the supply manifolds 116 and 116a, and is connected to the input of a centrifugal pump 194 (Figure 10) mounted in the upper portion of the washing machine. This pump is operated by a motor 195 connected to the pump through a belt 197. The pump may, for example, be similar to the two-stage high-pressure centrifugal pump described in the co-pending application of Emil Umbricht, Serial No. 462,661, filed on October 18, 1955, which issued as Patent No. 2,873,685. This pump 194 is arranged to deliver the cleaning liquid under the increased pressure through a pipe 196 that is connected by means of pipes 198 and 200 to the shafts 134a and 134 of the respective block interior flushing assemblies. Alternatively, the low pressure stage of this type of pump can be connected to supply the manifolds 116 and 116a, and the high pressure stage of the pump be used for supplying the rotatable interior flushing devices shown in Figures 12–16.

In order to prevent the flow of water through the manifold 192 from one of the supply manifolds 116 or 116a to the other supply manifold, suitable check valves are positioned in the manifold 192 on opposite sides of the pump 194. Such check valves may be formed, for example, by simple pivoted sheet metal gates, such as the one illustrated at 202 in Figure 17. In this view it will be noted that check valve 202 is arranged to permit cleaning liquid to flow from the manifold 116 into the high pressure supply manifold 192, but will not permit a reverse flow of the cleaning liquid.

Figure 17:
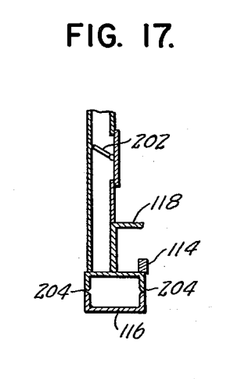
Figure 17 is a partial sectional view of the manifold system showing a check valve in the delivery system for the high pressure pump.

It will be noted that the supply manifolds 116 and 116a are formed of two sections of channel iron which are welded in face-to-face flange-to-flange relationship, as indicated at 204 in Figure 17. These liquid supply manifolds 116 and 116a, which extend longitudinally throughout the entire length of the washing machine, serve as structural frame members for the machine, and at the same time provide a convenient conduit for the delivery of the cleaning liquid, thus eliminating the need for extra plumbing through the length of the machine. Moreover, the flat surfaces of the conduit permit distribution pipes, such as the pipes 206 in Figure 11, to be readily connected at any desired point to the manifold merely by drilling a hole in the manifold and welding a fitting, such as those indicated at 208 in Figure 11, to the outer surface of the manifold. With this arrangement as many spray jets 26 as desired may be fitted onto the manifold and may be positioned both above and below the conveyor chain 22, or the jets may be positioned on the upper side of the conveyor chain 22.

The jets 26 may be of any desired type, and those shown in the patent of Emil Umbricht, No. 2,778,685 issued Jan. 22, 1957, are particularly suitable for this application.

From the foregoing it will be seen that the washing machine described herein is well adapted to obtain the ends and objects hereinbefore set forth and that it can be readily fabricated from easily available parts by well-known fabrication techniques. It will be apparent that the apparatus will be modified in accordance with the desirability of the parts which are to be washed, and that the scope of the invention in its broader sense is not limited to the washing of particular types or shapes of parts except as set forth in the following claims.

What is claimed is:

1. A parts cleaner for cleaning manufactured parts having interconnected internal passages with open ends at opposite sides of the parts, such as internal combustion engine parts, including a plurality of parts-holding fixtures each arranged to hold a part therein in a predetermined position, each fixture including a pair of spaced hollow fluid supply members having fluid-delivery openings adapted to be positioned closely adjacent to the respective open ends of the internal passages at opposite sides of the part for delivery under pressure into the internal passages, said pair of fluid supply members forming a pair of hollow trunnions for the fixture, conveyor means for moving said fixtures along a predetermined path, means for revolving each fixture about the trunnions, a pair of movable fluid delivery conduits on opposite sides of said path, means for simultaneously engaging said fluid delivery conduits with respective ones of said hollow fluid supply members, and a source of fluid under pressure communicating with said fluid delivery conduits, whereby each fixture is revolved about the trunnions as the part is purged by the fluid passing through said fluid supply members.

2. A parts cleaner as claimed in claim 1 and wherein said means for simultaneously engaging said fluid delivery conduits with said hollow fluid supply members includes spaced cams extending along opposite sides of said path, and spring means resiliently urging said cams towards engagement with said fluid delivery conduits.

3. A washer for washing automobile engine blocks comprising a wash chamber, a rinse chamber, a drying section, a continuous chain conveyor having a pair of spaced link and cross-pin type chains extending through said chambers and said drying section, motor means continuously driving said chain conveyor, a plurality of parts-holding fixtures positioned at spaced intervals along said conveyor, said fixtures including a pair of trunnions extending out through and rotatably supported by pairs of links of the two chains of the conveyor, means positioned at spaced intervals along the path of said conveyor arranged to rotate said parts-holding fixtures as they are moved forward by the conveyor, spray jets positioned along said path in said chambers arranged to spray cleaning liquid on said parts-holding fixtures, a blower arranged to blow air across said parts-holding fixtures in said drying station, a turntable positioned for receiving the blocks from the drying station, and second motor means for rotating said turntable in 90° increments.

4. An engine block washer comprising a wash chamber, a rinse chamber, a drying station, and a turntable for receiving the blocks from the drying station, and motor means for rotating said turntable by 90° increments, a continuous chain conveyor extending through said chambers and said drying station and past said turntable, motor means continuously driving said chain conveyor, a plurality of parts-holding fixtures positioned at spaced intervals along said conveyor, each of said fixtures including means for supporting said engine blocks and clamping means actuated by the receipt of one of said blocks in the fixture to clamp the block in the fixture, means positioned along the path of said conveyor arranged to rotate said parts-holding fixtures as they are moved forward by the conveyor, spray jets positioned along said path in said chambers arranged to spray cleaning liquid on said parts-holding fixtures, and a blower arranged to blow air across said parts-holding fixtures in said drying station.

5. A parts washer comprising a wash chamber and a drying section, a continuous chain conveyor passing therethrough and including a pair of chains, motor means for continuously moving said conveyor, a plurality of parts holding fixtures positioned at spaced intervals along said conveyor and each including a pair of trunnions for rotatably supporting the fixture, means positioned along the path of the conveyor arranged to rotate the parts-holding fixtures, at least one of the trunnions in each fixture being hollow, holding means on the fixture for holding a part therein in predetermined position, a jet member on the fixture having an internal passage communicating with said movable hollow trunnion, a hollow arm in said wash chamber adjacent to the path of said conveyor and communicating with a source of fluid under pressure, and means to clamp said hollow arm against the end of said hollow trunnion while said trunnion is moving and to feed fluid thereto under pressure for producing a fluid jet from said jet member, and said means to rotate the parts-holding fixtures being positioned along the portion of the path of the conveyor near said movable hollow arm, whereby said fixture rotates as it is continuously moving, as the fluid is fed from said arm through said hollow trunnion to said jet member.

6. A parts washer as claimed in claim 5 wherein said sprocket chains are directed along an arcuate path and said hollow arm swings along an arc concentric therewith, said means to rotate the parts-holding fixtures being positioned along said arcuate path for rotating the fixtures moving along said arcuate path.

7. A parts washer comprising a wash chamber and a drying section, a continuous chain conveyor passing therethrough and including a pair of chains, motor means for moving said conveyor, a plurality of parts-holding fixtures positioned at spaced intervals along said conveyor and each including a pair of trunnions for rotatably supporting the fixture, means positioned along the path of the conveyor arranged to rotate the parts-holding fixtures, at least one of the trunnions in each fixture being hollow, holding means on the fixture for holding a part therein in predetermined position, a jet member on the fixture having an internal passage communicating with said hollow trunnion, said chains being directed along an arcuate path, a hollow arm communicating with a source of fluid under pressure, said hollow arm swinging along an arc concentric with said arcuate path, and means to clamp said hollow arm against the end of said hollow trunnion and to feed fluid thereto under pressure for producing a fluid jet from said jet member, said means to clamp said hollow arm being arcuate cam concentric with said arcuate path.

8. A parts washer comprising a wash chamber, a rinse chamber, a drying section, a continuous chain conveyor having a pair of spaced link and cross-pin type chains extending through said chambers and said drying section, motor means continuously driving said chain conveyor, a plurality of parts-holding fixtures positioned at spaced intervals along said conveyor, said fixtures each including a pair of axially aligned trunnions extending out from opposite ends, each trunnion projecting through the centers of a pair of adjacent links of a respective one of the chains midway between and parallel with the pins at opposite ends of said pair of links, a sprocket wheel rigidly secured to each fixture and concentric with the trunnions, means positioned along the path of said conveyor arranged to rotate said parts-holding fixtures as they are moved forward by the conveyor comprising a series of sprocket-actuating members positioned along the path of said conveyor and arranged to engage the teeth of the sprocket, at least one of said trunnions being hollow, movable means along a portion of said conveyor path arranged to deliver cleaning fluid into the interior of said hollow trunnion, spray jets positioned along said path in said chambers arranged to spray cleaning liquid on said parts-holding fixtures, and a blower arranged to blow air across said parts-holding fixtures in said drying section.

9. A parts washer comprising a washing chamber and a drying section, a conveyor passing therethrough, motor means for driving said conveyor, a plurality of parts-holding fixtures positioned at spaced intervals along the path of said conveyor, said parts-holding fixtures including outwardly extending trunnions rotatably supporting said fixtures, a pair of spaced guide means for guiding each of said trunnions, means positioned along the path of the conveyor arranged to rotate the parts-holding fixtures as they are moved forward by the conveyor, spray jets positioned along said path, a first liquid supply manifold communicating with said jets, a first pump stage communicating with said manifold, at least one of said trunnions being hollow and means along a portion of said path arranged to deliver liquid under pressure to said hollow trunnion, a hollow jet member on the fixture communicating with said hollow trunnion and arranged to deliver the liquid to a part in the fixture, a second pump stage communicating with said manifold and arranged to deliver liquid to said hollow trunnion at substantially increased pressure.

10. In a parts washer, a fixture for carrying parts to be washed comprising a frame, clamping means arranged to clamp parts to be washed in said frame, and trunnions secured to said frame for rotatably supporting it, at least one of said trunnions being hollow and arranged to deliver cleaning liquid to the part being washed, means for moving said fixture along an arcuate path and simultaneously rotating said fixture about the axis of said trunnions, a liquid delivery arm mounted for arcuate movement around the center of the arcuate path of said fixture, one end of said arm being movable transversely toward and away from said hollow trunnion, and cam means arranged to urge said arm forward into engagement with said trunnion.

11. A parts washer comprising means defining a parts receiving position and means defining a parts delivery position and a continuous chain conveyor extending between said positions, a plurality of parts-holding fixtures positioned at spaced intervals along said conveyor, said conveyor including an endless chain extending between said positions, a conduit extending a substantial portion of the distance between said positions, a track for said chain secured to said conduit and supported thereby, means for guiding said chain along said track, and a plurality of fluid spray nozzles coupled to spaced points along said conduit and directed toward the path of said fixtures.

12. A parts washer comprising means defining a parts receiving position and means defining parts delivery position and a continuous chain conveyor extending between said positions, said conveyor including an endless chain extending between said positions, a plurality of parts-holding fixtures positioned at spaced intervals along said chain, a fluid conduit extending a substantial portion of the distance between said positions, a track secured to said conduit and extending along the length of said conduit, said chain straddling said track, a guide extending along the length of said conduit and holding said chain in position on said track, and a plurality of fluid spray nozzles coupled to spaced points along said conduit and directed toward said parts-holding fixtures.

13. A parts-washer as claimed in claim 12 and wherein said conduit is rectangular in cross section and said track is upstanding from the flat top surface of said conduit, and guide is L-shaped in cross section secured to said conduit with one flange projecting generally over said track.

14. Parts washing apparatus adapted for washing a plurality of parts each having openings therein communicating through the part from one side to the other comprising means defining a wash chamber, continuously moving conveyor mechanism including a plurality of parts-holding fixtures for moving parts into said wash chamber and out of said wash chamber, each of said fixtures moving along a predetermined path through said chamber for carrying a part to be washed and each fixture being revolvably mounted on a pair of hollow trunnions, clamping means arranged to clamp a part to be washed in said fixture in a predetermined region therein, said fixture including a pair of hollow jet supply members communicating with said hollow trunnions and aimed at opposite sides of said predetermined region in alignment with the openings in the opposite sides of the part, whereby to direct fluid into the openings in said part from opposite sides, fluid conduit means in said chamber on opposite sides of said fixture, a source of high pressure fluid communicating with said fluid conduit means, movable disengageable coupling means arranged to couple said conduit means to respective ones of said hollow trunnions for conveying fluid to said jet supply members; and means to revolve each fixture while said disengageable coupling means is in engagement with the respective hollow trunnions, whereby each part is purged by the jet supply members as it is revolved.

15. Parts washing apparatus adapted for washing a plurality of parts each having openings therein communicating through the part from one side to the other comprising means defining a wash chamber, mechanism for moving parts into said wash chamber and out of said wash chamber, a fixture in said chamber for carrying a part to be washed, clamping means arranged to clamp a part to be washed in said fixture in a predetermined region therein, said fixture including a pair of hollow jet supply members aimed at opposite sides of said predetermined region in alignment with the openings in the opposite sides of the part, whereby to direct fluid into the openings in said part from opposite sides, fluid conduit means in said chamber on opposite sides of said fixture, a source of high pressure fluid communicating with said fluid conduit means, disengageable coupling means arranged to couple said conduit means to respective ones of said jet supply members for conveying fluid thereto, and control mechanism connected to said disengageable coupling means and responsive to motion of said fixture in said chamber for engaging and disengaging said coupling means from said jet supply members.

16. Apparatus as claimed in claim 8 wherein said parts washer is adapted for the cleaning of parts having at least one internal cavity communicating with at least one external opening and wherein said fixture includes a hollow jet member in alignment with said external opening and connected to said hollow trunnion and arranged to deliver cleaning fluid to said internal cavity.

References Cited in the file of this patent

UNITED STATES PATENTS

| | | |
|---|---|---|
| 547,927 | Koch | Oct. 15, 1895 |
| 580,637 | Burrows | Apr. 13, 1897 |
| 734,063 | Hauck | July 21, 1903 |
| 812,757 | Levalley | Feb. 13, 1906 |
| 899,017 | Arnold | Sept. 22, 1908 |
| 915,898 | Sochurek | Mar. 23, 1909 |
| 1,043,010 | Hoofnagle | Oct. 29, 1912 |
| 1,083,558 | Powell | Jan. 6, 1914 |
| 1,206,120 | McCue | Nov. 28, 1916 |
| 1,417,162 | Gagen | May 23, 1922 |
| 1,674,064 | Ridley | June 19, 1928 |
| 2,107,890 | Frank | Feb. 8, 1938 |
| 2,239,073 | Arey | Apr. 22, 1941 |
| 2,328,162 | Mercil | Aug. 31, 1943 |
| 2,461,162 | Laird | Feb. 8, 1949 |
| 2,571,581 | Kearney | Oct. 16, 1951 |
| 2,604,896 | Cozzoli | July 29, 1952 |
| 2,644,473 | Fox | July 7, 1953 |